US008839236B2

(12) United States Patent
Carpenter et al.

(10) Patent No.: US 8,839,236 B2
(45) Date of Patent: Sep. 16, 2014

(54) VIRTUAL MACHINE SUPPORT FOR METERED COMPUTER USAGE

(75) Inventors: Todd L. Carpenter, Monroe, WA (US); William J. Westerinen, Issaquah, WA (US); Thomas G. Phillips, Bellevue, WA (US); Curt Andrew Steeb, Redmond, WA (US); Zhangwei Xu, Redmond, WA (US); Alexander Frank, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 2039 days.

(21) Appl. No.: 11/696,271

(22) Filed: Apr. 4, 2007

(65) Prior Publication Data

US 2008/0250406 A1 Oct. 9, 2008

(51) Int. Cl.
*G06F 9/455* (2006.01)

(52) U.S. Cl.
USPC .............................................................. 718/1

(58) Field of Classification Search
None
See application file for complete search history.

(56) References Cited

U.S. PATENT DOCUMENTS

| | | |
|---|---|---|
| 4,562,306 A | 12/1985 | Chou et al. |
| 5,638,513 A | 6/1997 | Ananda |
| 6,115,680 A | 9/2000 | Coffee et al. |
| 6,301,666 B1 | 10/2001 | Rive |
| 6,966,000 B2 | 11/2005 | Zhang et al. |
| 6,978,303 B1 | 12/2005 | McCreesh et al. |
| 7,080,051 B1 | 7/2006 | Crawford |
| 7,689,817 B2 * | 3/2010 | Zimmer et al. ............... 713/1 |
| 7,797,707 B2 * | 9/2010 | Cherkasova et al. .......... 719/310 |
| 2002/0156738 A1 | 10/2002 | Irmler |
| 2003/0076242 A1 | 4/2003 | Burns et al. |
| 2003/0135380 A1 | 7/2003 | Lehr et al. |
| 2004/0030912 A1 * | 2/2004 | Merkle et al. ................. 713/200 |
| 2005/0192906 A1 | 9/2005 | Berstis |
| 2006/0136747 A1 * | 6/2006 | Ahdout et al. ................ 713/189 |
| 2006/0200820 A1 | 9/2006 | Cherkasova et al. |
| 2006/0218277 A1 | 9/2006 | Birkestrand |

OTHER PUBLICATIONS

Montalbano, E. "AMD to resell Transmeta chip for pay-as-you-go PCs," Infoworld, Jun. 2006, http://www.infoworld.com/article/06/06/05/78963_HNamdtransmeta_1.html.
"Pay per use Terminology," Hewlett-Packard Development Company, L.P., 2006, http://docs.hp.com/en/5991-5554/apds01.html.
"The Technology behind Microsoft FlexGo," Microsoft Corporation, 2007, http://www.microsoft.com/whdc/flexgo/tech.mspx.
"International Search Report", Mailed Date: Apr. 28, 2011, Application No. PCT/US2008/059509, Filed Date: Apr. 4, 2008, pp. 9.
Barmouta, et al., "GridBank: A Grid Accounting Services Architecture (GASA) for Distributed Systems Sharing and Integration", Proceedings of the 17th International Symposium on Parallel and Distributed Processing, Apr. 22-26, 2003, pp. 8.

* cited by examiner

*Primary Examiner* — Gregory A Kessler
(74) *Attorney, Agent, or Firm* — Steve Wight; Carole Boelitz; Micky Minhas

(57) ABSTRACT

A virtual machine monitor provides a trusted operating environment for a software usage metering application when a qualified virtual machine monitor is loaded as part of trusted boot and when all other programs and operating systems run in containers managed by the virtual machine monitor. The virtual machine monitor may also host a locking application for limiting the functionality of the computer if contractual terms of use are not met. Both the metering and locking applications run at a higher privilege level than ring 0, at the same level as the virtual machine monitor.

19 Claims, 8 Drawing Sheets

VIRTUAL MACHINE SUPPORT FOR METERED COMPUTER USAGE

BACKGROUND

A business model that offers computers or other electronic devices at a subsidized price may rely on the enforcement of pay-per-use terms and conditions to recover the investment of an underwriter. Metering and policy enforcement may require special circuitry to ensure that an unscrupulous user does not obtain a computer for free or at a reduced price and then renege on subsequent payments.

Such special circuitry may be effective, and, at some points, necessary. However the special circuitry may be expensive and require not only special handling during manufacturing, but may also require special training and equipment to maintain and service.

A concept of a virtual machine was developed to allow software to be written once and run in many different hardware and operating system environments. Briefly, software written for a virtual machine is written to an abstraction layer. A virtual machine monitor that implements the abstraction layer may be written for many different hardware/OS combinations. Then, the software may be run on any machine for which a virtual machine monitor environment is available. The virtual machine monitor may include an interpreter in some embodiments. The software may be compiled, interpreted, or a combination of both.

FIG. 1A illustrates prior art computing environment 10 with a virtual machine implementation typical of a Java Virtual Machine (JVM) developed by Sun Microsystems Corporation. The environment may have a hardware layer 11 including a processor, memory, and peripherals. In this embodiment, the host operating system 12 runs on the hardware layer 11 and a virtual machine monitor 14 runs on the host operating system 12. Applications may run in virtual machine containers 16 and 18 on the virtual machine monitor 14. The virtual machine containers 16 and 18 may be individual operating environments presented by the virtual machine monitor 14 such that any application or similar service running in the virtual machine container 16 or 18 appears to have full and exclusive use of all the services available in the computing environment. In this configuration, the computing environment may support different levels of security, or rings. The host operating system 12 may run in highest security ring, ring 0. Applications may run at a low security ring, such as ring 3.

FIG. 1B illustrates a prior art computing environment 20 with a virtual machine monitor implementation typical of a Virtual PC from Microsoft Corp. or VMware GSX available from VMware, Inc. In this embodiment, a hardware layer 21 supports both a host operating system 22 and a virtual machine monitor 24. Both the host operating system 22 and the virtual machine monitor may run in security ring 0, while the virtual machine containers 26 28 and their associated applications, including other operating systems, may run in security ring 3.

FIG. 1C illustrates a prior art computing environment 30 with a virtual machine monitor implementation typical of Viridian from Microsoft Corporation or VMware ESX from VMware, Inc. The hardware layer 31 supports a virtual machine monitor 32 running containers 34 and 36. Since the virtual machine monitor 32 provides the only access to the hardware layer 31, the virtual machine containers 34 and 36 will run both operating systems and applications. Since an operating system expects to have the highest level of security access, ring 0, the OS of the virtual machine container 34 or 36 must be given ring-0 security rights. However, to protect the virtual machine monitor 32 from tampering by the OS, such embodiments have implemented a more secure operating layer than ring 0, sometimes called VMX root or ring −1.

SUMMARY

A metered-use device, such as a pay-per-use computer, may use a specialized virtual machine monitor (VMM) for metered operation. The VMM operating directly above a hardware level and with a higher security access than any operating system or applications may be used to administer pay-per-use metering and policy enforcement. Metering and/or locking applications may also operate at the same security level as the VMM to allow full access to system resources and to reduce the risk of tampering. Because the VM oversees every operation between the operating system and the underlying hardware, the VM can effectively support metering and locking operations using any number of metrics including CPU usage, peripheral usage, network traffic, user interface activity, or non-sleep mode time.

A restricted mode of operation may be entered when terms associated with metered use have not been met. For example, if a subscription for monthly use expires, the computer may be locked, allowing only operations necessary for entering proof that unrestricted operation should again be allowed. When in a restricted mode of operation, the locking application, in conjunction with the VMM, may restrict the amount of memory available to system applications as well as the number and type of peripherals and accessories that may be used.

Because software metering and locking applications are likely to be the target of hacking attempts, it may be desirable to take additional precautions to protect the operating environment. In order to provide a chain of trust from initial power-on, a verified ROM bootstrap may be run from a trusted location. The ROM bootstrap may then validate a BIOS program for completing the boot cycle of the computer. The BIOS program may chain to the VMM, allowing the VMM to be established prior to operation of any other application or service.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 2:
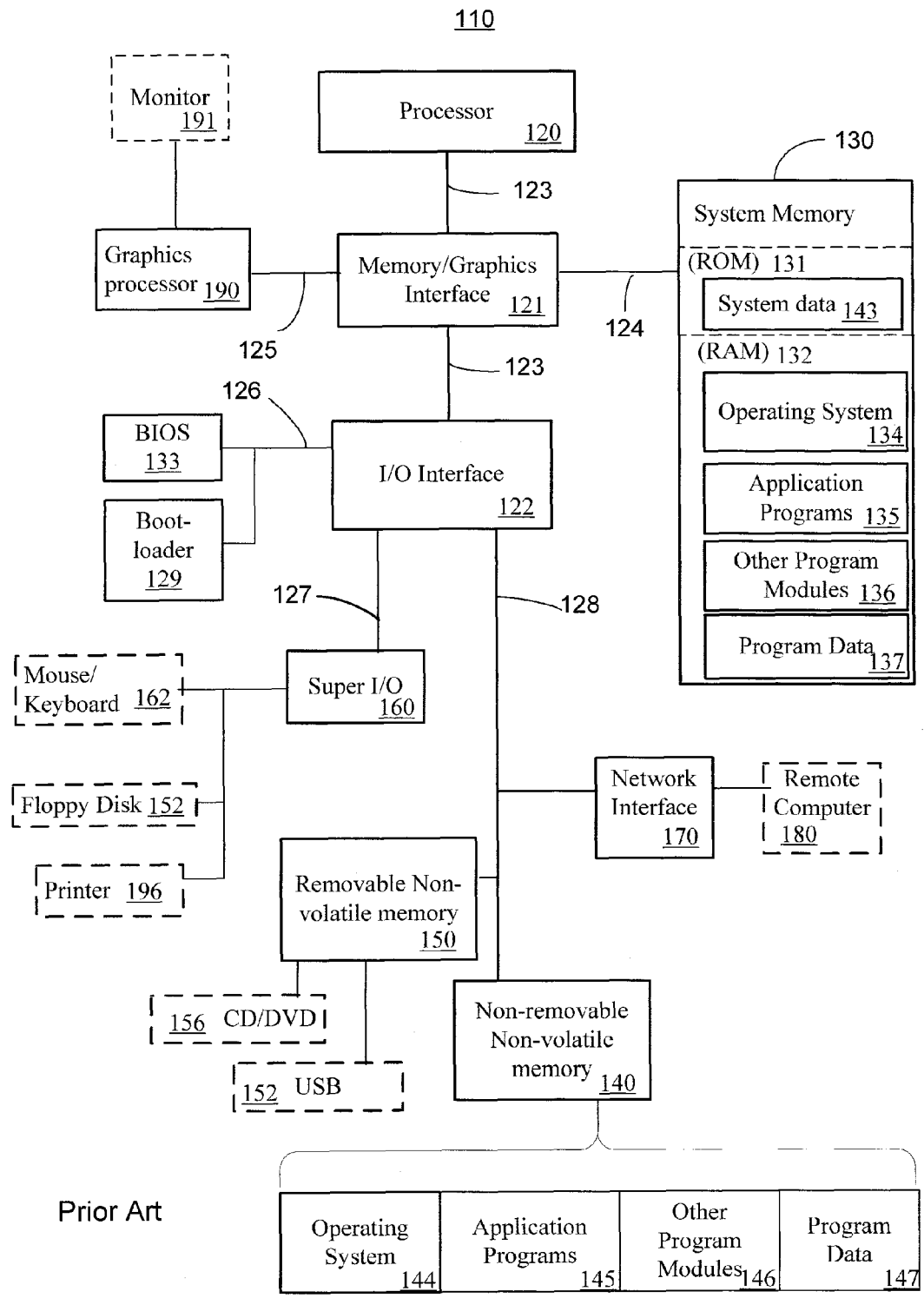
FIG. 2 is a block diagram of a computer supporting use of a virtual machine monitor for metering computer usage.

With reference to FIG. 2, an exemplary system for implementing the claimed method and apparatus includes a general-purpose computing device in the form of a computer 110. Components shown in dashed outline are not technically part of the computer 110, but are used to illustrate the exemplary embodiment of FIG. 2. Components of computer 110 may include, but are not limited to, a main processor 120, a system memory 130, a memory/graphics interface 121, also known as a Northbridge chip, and an I/O interface 122, also known as a Southbridge chip. A memory 130 and a graphics processor 190 may be coupled to the memory/graphics interface 121. A monitor 191 or other graphic output device may be coupled to the graphics processor 190.

A series of system busses may couple various these system components including a high speed system bus 123 between the main processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 121 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

Computer 110 typically includes a variety of computer readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer: readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

A bootloader 129 may store information associated with securely booting the computing device, such as a measured BIOS. It is desirable to have an initial operation associated with a secure boot performed from a known, fixed, read-only memory (ROM). However, it is impractical to have an entire BIOS in ROM, if for no other reason than ease of maintenance. For that reason, a small bootloader 129 may be stored in a trusted memory location and used to measure and call a full BIOS. As shown in FIG. 2, the boot-loader 129 is a separate component, and may be, for example, in a smart chip. In other embodiments, the bootloader 129 may be incorporated in a chipset component, such as the I/O interface 122 or in the processor 120. A processor-based bootloader 129 can give a very high confidence in the integrity of the boot.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by main processor 120. By way of example, and not limitation, FIG. 2 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 128 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 122 may be connected to the I/O interface 121 with a low pin count (LPC) bus, in some embodiments. The super I/O chip is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 2 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid-state RAM, solid-state ROM, and the like.

The drives and their associated computer storage media discussed above and illustrated in FIG. 2 provide storage of computer-readable instructions, data structures, program modules and other data for the computer 110. In FIG. 2, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection depicted in FIG. 2 may include a local area network (LAN), a wide area network (WAN), or both, but may also include other networks. Such networking environments are commonplace in offices, enterprise-wide computer networks, intranets and the Internet.

In some embodiments, the network interface may use a modem (not depicted) when a broadband connection is not available or is not used. It will be appreciated that the network connection shown is exemplary and other means of establishing a communications link between the computers may be used.

Figure 1A:
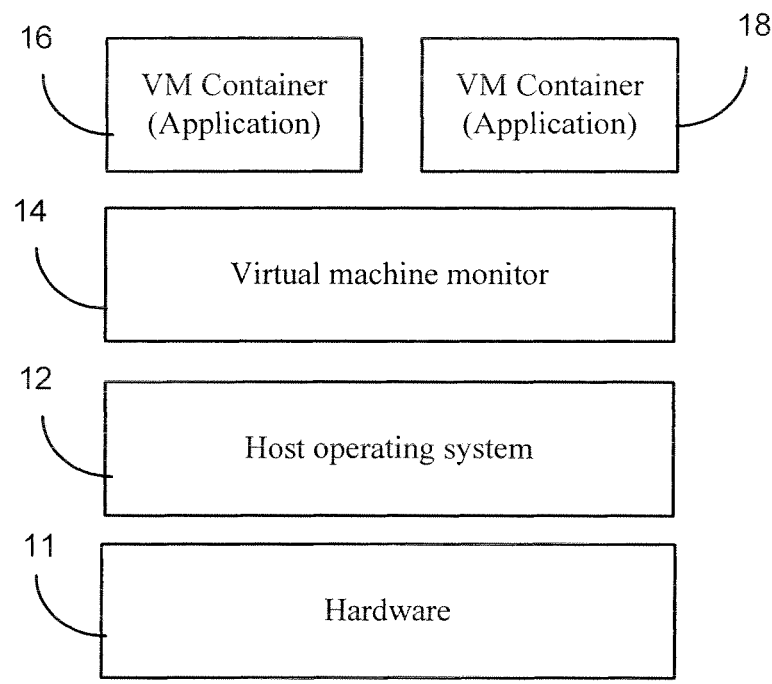
FIG. 1A is an illustration of a prior-art architecture of a virtual machine monitor-based computer.
Figure 1B:
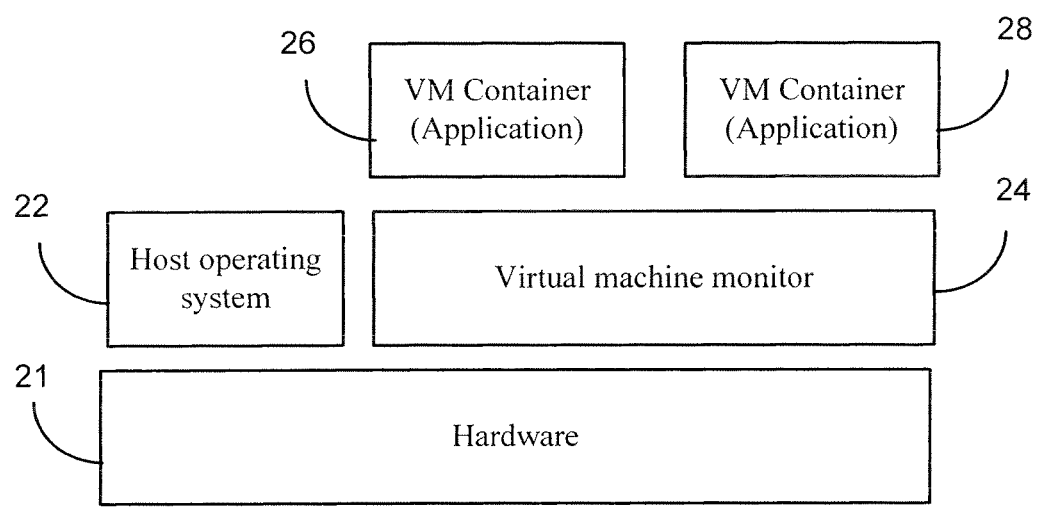
FIG. 1B is an illustration of another prior-art architecture of a virtual machine monitor-based computer.
Figure 1C:
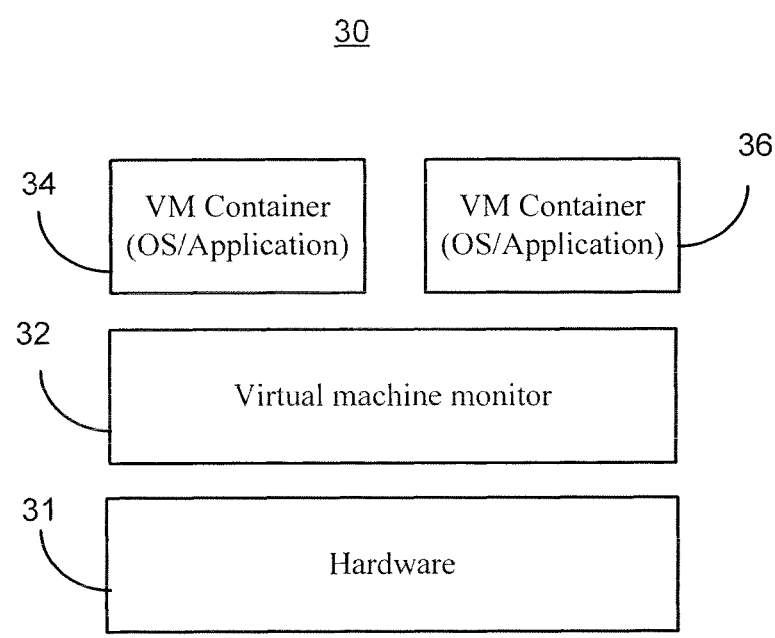
FIG. 1C is an illustration of yet another prior-art architecture of a virtual machine monitor-based computer.
Figure 3:
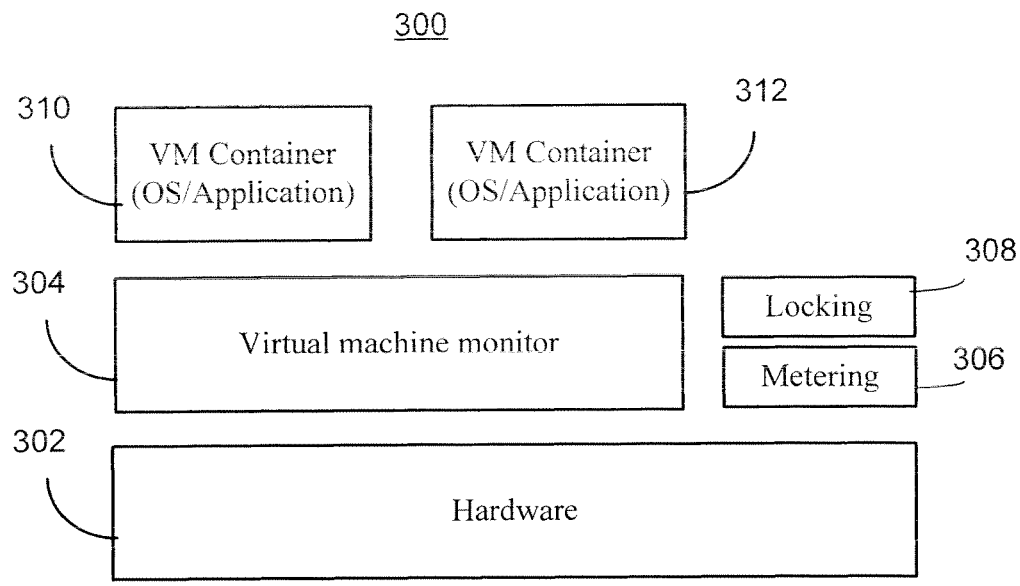
FIG. 3 is simplified and representative architecture of virtual machine monitor-based computer.

FIG. 3 illustrates a computing environment 300 similar to the prior art computing environment of FIG. 1C, with a hardware layer 302 supporting a virtual machine monitor 304 running at a higher level of security than any OS or other application running in a VM container 310 or 312. To support a VMM-based metering environment, this configuration is preferred to configurations similar to FIGS. 1A and 1B, where a host operating system runs at the same or higher security level than the VMM. A metering application 306 and locking application 308 may run at the same security level as the virtual machine monitor 304. The VMM 304 may pass data to the metering application 306 for use in maintaining metering information. Alternatively, the metering application 306 may directly monitor and extract the information necessary for metering. Because the metering application 306 has access, either directly or through the VMM 304, to both hardware and software activity, the metering application 306 may be able take finer-grain measurements, including application software metering, than may be available to a hardware-based metering application.

Figure 4:
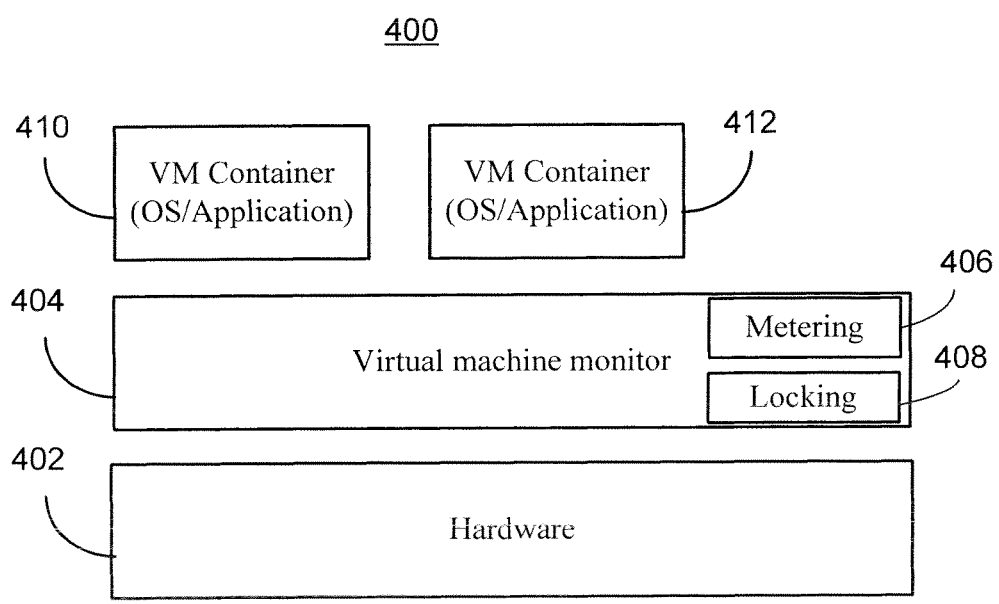
FIG. 4 is simplified and representative architecture of another embodiment of a virtual machine monitor-based computer.

FIG. 4 illustrates an alternate computing environment 400 similar to that of the configuration of FIG. 3. A hardware layer 402 may support a virtual machine monitor 404. The virtual machine monitor 404 may launch and manage a number of VM containers 410 and 412 in which both entire operating systems and individual applications may be executed. The virtual machine monitor 404 may have integrated metering 406 and locking 408 applications that are integral to the VMM 404.

Figure 5:
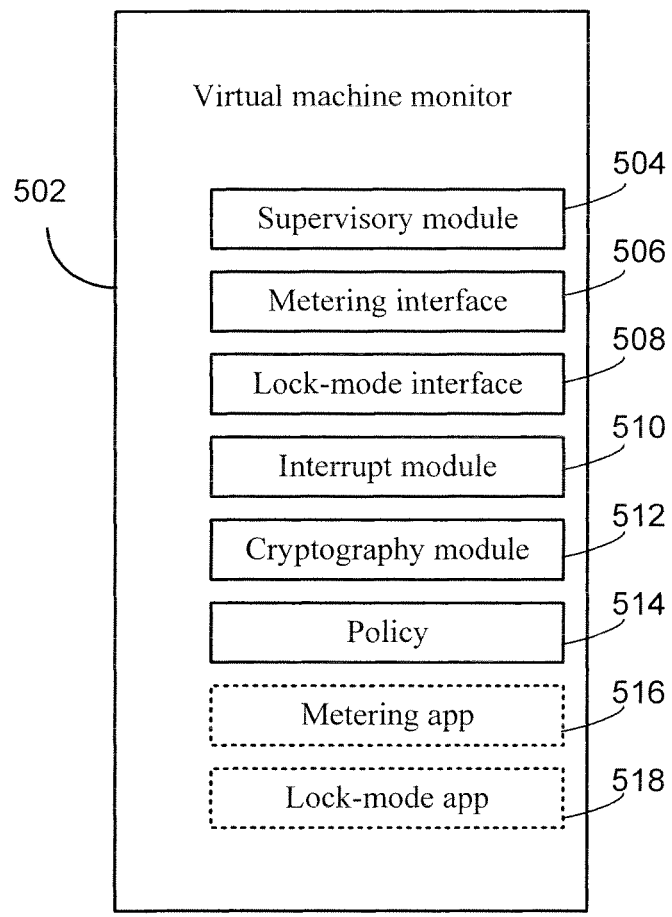
FIG. 5 is a simplified and representative block diagram of a VMM.

FIG. 5 is a simplified and representative block diagram showing functional elements of a virtual machine monitor 502 adapted for use in a metered-usage application. The functional elements illustrated may be software embodied as computer-executable instructions stored on a computer-readable medium. The virtual machine monitor 502 may include a supervisory module 504 for includes most, if not all, of the functions associated with a prior art virtual machine monitor, such as management of hardware interfacing as well as establishment and maintenance of virtual machine containers.

In addition, a virtual machine monitor 502 may include a metering interface 506 that manages a data transfer to a metering application, such as metering application 306 of FIG. 3. The metering interface may be customized to a particular type of metering, such as usage time metering that is on whenever there is CPU activity associated with user processes. Other metering types may include disk access metering, CPU cycle metering, or network traffic metering, etc. The metering interface 506 may be customized for metering data types during development or may customized at run-time via a policy setting.

A lock-mode interface 508 may respond to instructions from a lock-mode application, such as locking application 308 of FIG. 3. The lock-mode interface may respond to an instruction for reducing the functionality of the computer by limiting available memory, limiting I/O device functionality or memory access, or restricting the type and number of applications that can be run.

A interrupt module 510 may respond to a timed interrupt to ensure that the virtual machine monitor 502 is executed with enough frequency to ensure metering operations are consistent and accurate. The interrupt module 510 may include a software timer or a physical timer and interrupt line (not depicted) may be added to the computer hardware to help ensure proper operation.

A cryptography module 512 may support cryptographic calculations for the qualification of messages, secure storage of a data, such as metering data or setting information. The cryptographic module 512 may support both symmetric and asymmetric cryptography. An example of symmetric crypto is the advanced encryption standard (AES). An example of asymmetric crypto is elliptic curve cryptography (ECC). In operation, the cryptographic module 512 may encrypt and store data in non-trusted memory. For example, metering and time data may periodically be encrypted and stored and at a given interval, either usage or time, the data may be retrieved, decrypted, and compared to a current usage or time value. If the comparison is not within a predetermined limit, a fraudulent condition may occur and a decision may be made as to whether to enter the locked mode of operation.

A policy module 514 may allow policy decisions related to type of metering, verification checks for value and time, response to fraudulent activity recovery from locked mode, etc. The policy module 514 may use verifiable policy data received from an external source or may be fixed with respect a given version of virtual machine monitor 502.

As discussed with respect to FIG. 4, one embodiment of the virtual machine monitor 502 may include metering and lock-mode applications 516 and 518, respectively. The metering application, depending on the contract type, may keep track of stored usage value or subscription expiration dates. The metering application may also be responsible for accumulating usage metrics to determine when usage value is below a limit value.

The lock-mode application 518 may enforce a limited function mode by restricting memory access and peripheral device I/O to only allow minimal functions related to restoration of system for full use. Such functions may include a limited graphics output mode, keyboard-only input, and read-only removable storage access. In some embodiments, network access may be allowed.

Figure 6:
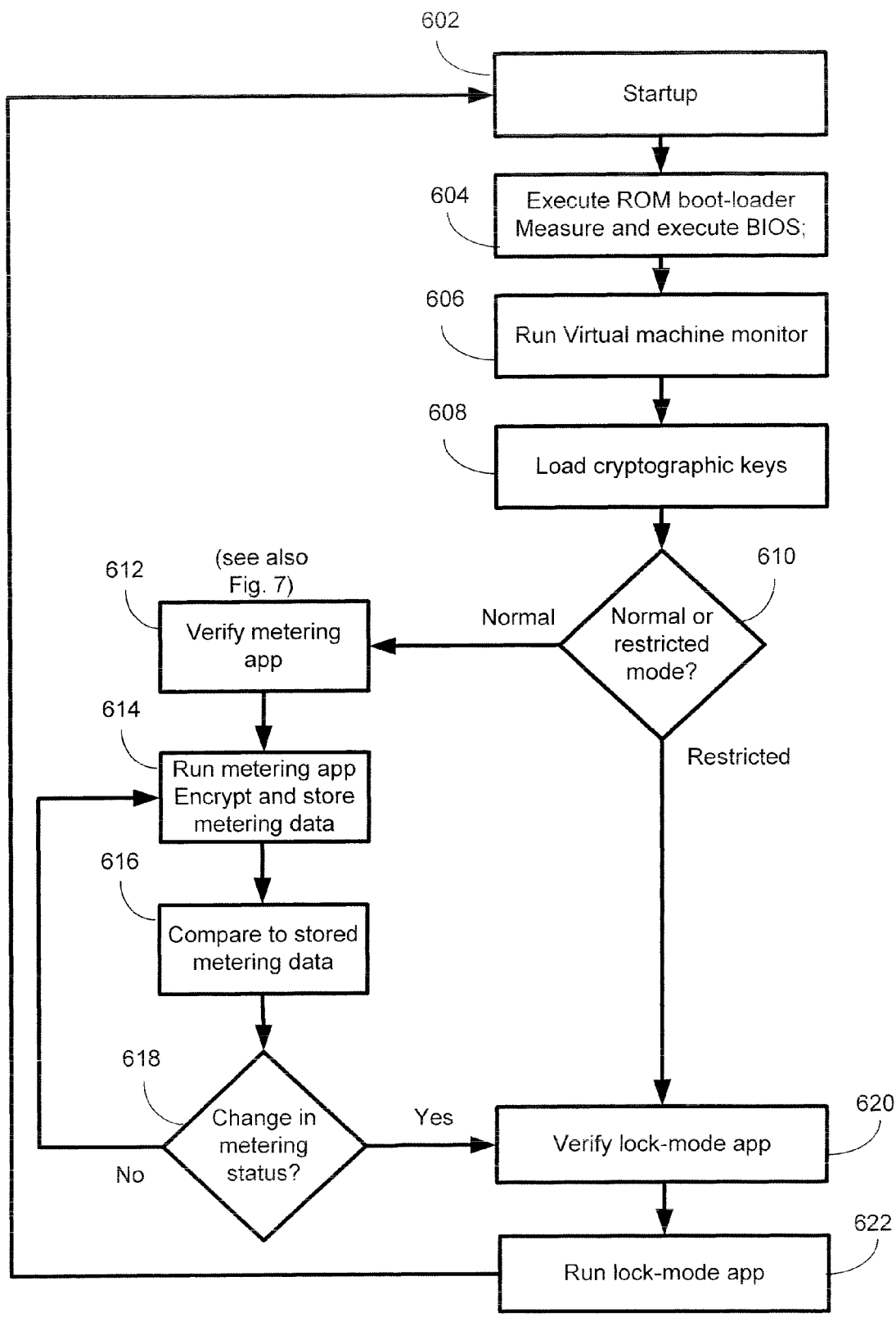
FIG. 6 is a flow chart illustrating use of a VMM for metering computer usage.

FIG. 6 illustrates a method of using a virtual machine monitor 502 for operation of computer adapted for pay-per-use or metered-use operation. At block 602, the computer may be started, either from a cold boot (power up) or a warm boot (restart). At block 604, the initial activity of the processor, such as processor 120 of FIG. 2, may be directed by a boot vector to a known address. A boot-loader program 129 may be loaded and executed from a trusted location. The boot-loader program 129 may measure (e.g. cryptographically verify) and execute a basic input/output system (BIOS) to support the initial device operation for the computer, such as disk access. In some embodiments, the BIOS is loaded into RAM before it is measured. At block 606, a virtual machine monitor 304, may be loaded. To retain the integrity of the secure boot process, the virtual machine monitor may be loaded and executed before any other executable code. At block 608, cryptographic keys used for later verification of application programs, such as a metering program may be loaded.

At block 610, the virtual machine monitor may determine if the computer is to be operated in a full-use, or normal, mode or a restricted-use mode. If full-use mode, the 'normal' branch from block 610 may be followed to block 612, where a metering application 306 may be measured and, at block 614, executed. The metering application 306 may encrypt, using keys loaded at block 608, a current metered usage value, a current date and time, or both. The metering application 306 may then store the value or values for later comparison. Metering operations may continue according to policy information available from a trusted source or cryptographically verified if from an untrusted source.

At block 616, the values stored at block 614 may be retrieved and compared to current values in view of known usage since the last store, or at least to verify that the values have moved in the expected directions.

At block 618, the change in metering status may be evaluated against criteria for acceptable differences between the measured and calculated values. If the difference is acceptable, the 'no' branch from block 618 may be taken to block 614 and metering continued. Other criteria may be considered at block 618, such as whether prepaid usage value has a sufficient balance for continued operation, whether a subscription expiration date has passed, or whether tampering with secure components has been detected. If any of the tests performed at block 618 fail, the 'yes' branch from block 618 may be followed to block 610.

At block 620, the lock-mode application 308 may be verified and, at block 622, the lock-mode application 308 may be executed to place the computer in a restricted mode of operation. When in the restricted mode of operation, the computer may not be available for beneficial use by a user, but may only be capable of entering data to prove compliance with pay-per-use terms, such as adding value to a usage balance or subscription date extension.

Figure 7:
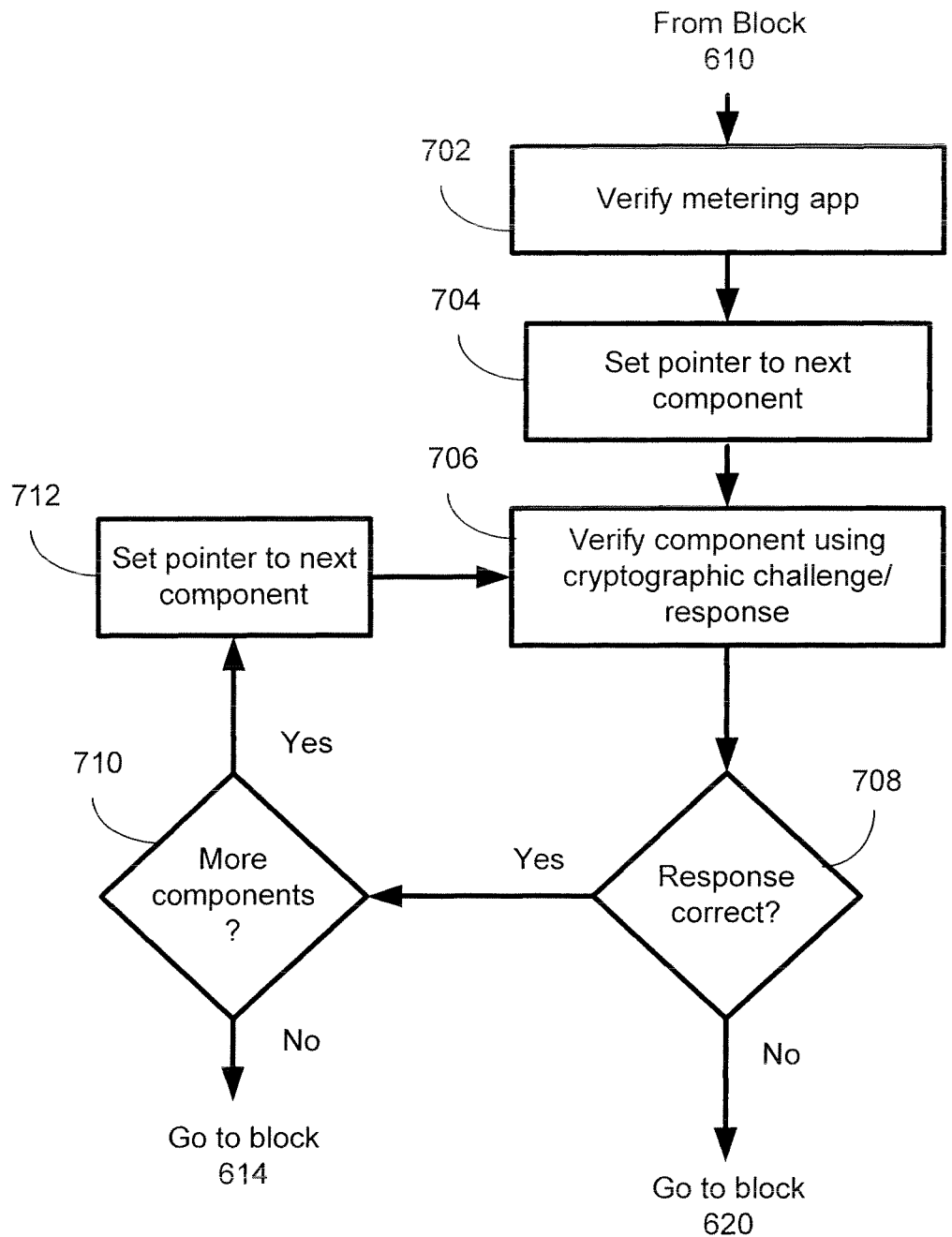
FIG. 7 is a flow chart of an illustrating an expanded use of the VMM for computer monitoring.

FIG. 7 illustrates an expanded use of a virtual machine monitor, such as virtual machine monitor 502 of FIG. 5 to support component binding. Component binding may be considered an extension of metering in the sense that metered-computer value is controlled to protect the interests of an underwriter. One measure of value is the ability to use to the computer. As described above, the use of the restricted mode of operation prevents the user from receiving value through beneficial use when their obligations under a contract have not been maintained. Another form of value that may be extracted from the computer are the actual components themselves. For example, the processor 120, memory/graphics interface 121, the I/O interface 122, the network interface 170, and any form of memory 130, 140, etc. may all be stripped from a computer and sold as spare parts. The underwriter's investment would be irrecoverably lost if the computer is stripped for parts and sold as separate components.

To combat such a scenario, FIG. 7 illustrates a method of using the virtual machine monitor 502 to expand the verification performed at block 612 of FIG. 6. In this illustrative method component verification is performed one time at the beginning of the cycle. In other embodiments, component verification may be performed periodically during operation, for example by incorporating the method of FIG. 7 in FIG. 616 of FIG. 6. The virtual machine monitor 502 provides an ideal platform for component checking because of its ability to perform such checking before regular OS activity is initiated and because it has access to every element of the computer available to the operating system.

At block 702, following from block 610, verification of the metering app may be performed as described above with respect to block 612. At block 704, a list of components to be verified may be read and a pointer set to a first component to be verified. At block 706, a standard challenge/response may be performed with the component to be verified. For example, a nonce may be generated by the virtual machine monitor's cryptography module 512 and encrypted with a known key. The encrypted nonce may be sent to a high value component, for example, a memory/graphics interface chip, such as chip 121 of FIG. 2. An add-on security or cryptographic function in the memory/graphics interface 121 may decrypt the nonce and send it back to the virtual machine monitor 502.

If at block 708, the nonce is correct the yes branch from block 708 may be followed to block 710. If, at block 710, more components are to be checked the 'yes' branch from block 710 may be followed to block 712. At block 712, the pointer may be set to the next component to be verified in the operation continued at block 706.

If, at block 708, the nonce is not correct, or another error occurs such as no response or an untimely response, the 'no' branch from block 708 may be taken to a point where a sanction may be invoked, for example, block 620 of FIG. 6.

If, at block 710, no more components are to be checked, the 'no' branch from block 710 may be taken to a point where normal operation may continue, for example, block 614 of FIG. 6.

The ability to run metering and enforcement applications in a virtual machine monitor environment is beneficial to manufacturers and underwriters alike in that computers so outfitted may have final programming postponed to late in the manufacturing process or even after delivery into the distribution system. Underwriters benefit from a lower cost machine to improve their business model. Users may also benefit from a virtual machine-based metering environment when maintenance or updates are required and remote maintenance may be available via a qualified service facility.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of operating an electronic device arranged and adapted for metered use comprising:
    activating a virtual machine monitor running at a higher level of security than any operating system and other application running in a virtual memory container prior to starting an operating system or an application;
    verifying the virtual machine monitor to ensure integrity of a secure boot-up process;
    starting a metering application under the control of the virtual machine monitor, the virtual machine monitor providing a tamper-resistant operating environment;
    starting at least one of an operating system in a virtual memory container and an application in a virtual memory container under the control of the virtual machine monitor;
    providing measurement data from the virtual machine monitor to the metering application;
    metering usage of the electronic device at the metering application using the measurement data from the virtual machine monitor; and
    operating the electronic device in a restricted mode using the virtual machine monitor to limit access of the at least one of an operating system in a virtual memory container and an application in a virtual memory container to system hardware of the electronic device when terms of use are not met based on the metered usage and allowing only operations necessary for entering proof that unrestricted operation should again be allowed.

2. The method of claim 1, further comprising metering usage of the operating system using the metering application.

3. The method of claim 1, further comprising metering usage of the application using the metering application.

4. The method of claim 1, further comprising controlling an I/O memory manager via the virtual machine monitor to restrict peripheral device access to physical memory.

5. The method of claim 1, further comprising booting the electronic device using a known BIOS, wherein activating the virtual machine monitor follows booting the electronic device before any other programs are activated.

6. The method of claim 1, further comprising guaranteeing execution cycles for the virtual machine monitor using a timing interrupt.

7. The method of claim 1, wherein starting the metering application comprises cryptographically verifying the metering application prior to starting the metering application.

8. The method of claim 1, further comprising cryptographically verifying the presence of at least one pre-determined component of the electronic device.

9. A virtual machine monitor implemented on a computer-readable storage medium with instructions executable by a metered-use computer, comprising:
    a supervisory mode module, running at a higher level of security than any operating system and other application running in a virtual memory container, supporting operation of a plurality of a virtual machine containers;
    a metering module that supports transfer of measurement data to a metering application; and
    a lock-mode interface module that operates in accordance with a lock-mode policy for restricting operation of the metered-use computer when certain conditions of the lock-mode policy are met and allowing only operations necessary for entering proof that unrestricted operation should again be allowed.

10. The virtual machine monitor of claim 9, wherein the metering module further supports transfer of metering data from any process running in one of the plurality of virtual machine containers.

11. The virtual machine monitor of claim 9, further comprising an interrupt module that responds to a timing interrupt to ensure virtual machine monitor execution cycles.

12. The virtual machine monitor of claim 9, further comprising a cryptography module for verifying the integrity of a metering application prior to launching the metering application.

13. The virtual machine monitor of claim 12, wherein the cryptographic module further supports encryption of a metering balance and a last known time.

14. The virtual machine monitor of claim 9, further comprising a policy module that ensures the metering module loads prior to operations subject to metering.

15. A computer arranged and adapted for operation in a full-use mode and a limited-use mode having a computer-readable storage medium storing computer-executable instructions thereon for implementing a method when executed by the computing device comprising:
    executing a ROM-based boot loader from a trusted component;
    validating a BIOS program via the boot loader;
    booting the computer from the BIOS program;

starting a virtual machine monitor, running at a higher level of security than any other program, prior to starting any other program after booting the computer;

verifying a metering program;

executing the metering program at the same operating level as the virtual machine monitor; and executing a locking application at the same operating level as the virtual machine monitor when a condition exists that requires the limited-use mode of operation, whereby the locking application causes the virtual machine monitor to limit operation of at least one of an operating system and an application program running in a virtual machine container under the control of the virtual machine monitor by limiting access to available memory, input or output device functionality and restricting the number or type of applications that can be run.

16. The computer of claim 15, wherein the method further comprises:

verifying a locking application prior to executing the locking application.

17. The computer of claim 16, wherein the method further comprises:

comparing a stored time value with a current time value to determine if clock tampering is evident; and executing the locking application when tampering is evident.

18. The computer of claim 15, wherein executing the locking application comprises restricting peripheral component operation by limiting peripheral component direct memory access by reprogramming an input/output memory management unit.

19. The computer of claim 15, wherein the method further comprises:

retrieving a cryptographic key from the trusted environment;

encrypting a metering value using the cryptographic key; and storing the metering value in a non-trusted memory.

* * * * *